US010791200B2

(12) United States Patent
Luo et al.

(10) Patent No.: US 10,791,200 B2
(45) Date of Patent: Sep. 29, 2020

(54) METHOD, APPARATUS AND SERVER FOR PROVIDING VOICE SERVICE (71) Applicant: Baidu Online Network Technology (Beijing) Co., Ltd., Beijing (CN)

(72) Inventors: Xing Luo, Beijing (CN); Guanghao Shen, Beijing (CN); Peng Wang, Beijing (CN); Juntao Xue, Beijing (CN); Jidong Wang, Beijing (CN); Sijie Yang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/507,248

(22) Filed: Jul. 10, 2019

(65) Prior Publication Data
US 2019/0335020 A1 Oct. 31, 2019

Related U.S. Application Data (63) Continuation of application No. PCT/CN2017/118008, filed on Dec. 22, 2017.

(30) Foreign Application Priority Data

Jun. 30, 2017 (CN) .......................... 2017 1 0525724

(51) Int. Cl.
*G06F 15/16* (2006.01)
*H04L 29/06* (2006.01)
(Continued)

(52) U.S. Cl.
CPC .......... *H04L 69/08* (2013.01); *G10L 15/1822* (2013.01); *G10L 15/22* (2013.01);
(Continued)

(58) Field of Classification Search
CPC ..... H04L 69/08; H04L 69/326; H04L 63/102; H04L 67/20; H04L 67/16; H04L 67/32;
(Continued)

(56) References Cited

U.S. PATENT DOCUMENTS

2002/0184373 A1* 12/2002 Maes .................... H04L 69/329
709/228
2003/0088421 A1* 5/2003 Maes ...................... G10L 15/30
704/270.1
(Continued)

FOREIGN PATENT DOCUMENTS

CN 101567941 A 10/2009
CN 101699840 A 4/2010
(Continued)

OTHER PUBLICATIONS

International Patent Application No. PCT/CN2017/118008; International Search Report and Written Opinion dated Mar. 21, 2018; 9 pgs. (relevance found in English ISR and citations).

*Primary Examiner* — Richard G Keehn
(74) *Attorney, Agent, or Firm* — Lathrop GPM LLP (57) ABSTRACT The present disclosure discloses a method, apparatus and server for providing a voice service. The method includes: receiving a request message for providing a target voice service to a device end that has accessed a third-party voice service, the request message including a request content and status information of the device end; acquiring a response message generated after processing the request content based on the status information, the response message including an operation instruction; and sending the response message to the device end. The request message and response message are generated according to a message format configured in a constructed data service framework model of the target voice service, and transmitted based on a transport protocol configured in the constructed data
(Continued)

service framework model; and the message format is consistent with that of the third-party voice service, and the transport protocol is consistent with that of the third-party voice service.

21 Claims, 5 Drawing Sheets

(51) Int. Cl.
*G10L 15/18* (2013.01)
*G10L 15/22* (2006.01)
*G10L 15/30* (2013.01)
*H04L 29/08* (2006.01)

(52) U.S. Cl.
CPC ............ *G10L 15/30* (2013.01); *H04L 63/102* (2013.01); *H04L 67/16* (2013.01); *H04L 67/20* (2013.01); *H04L 67/32* (2013.01); *G10L 2015/223* (2013.01); *H04L 69/326* (2013.01)

(58) Field of Classification Search
CPC ..... G10L 15/1822; G10L 15/22; G10L 15/30; G10L 2015/223
See application file for complete search history.

(56) References Cited

U.S. PATENT DOCUMENTS

| | | | |
|---|---|---|---|
| 2008/0162637 A1* | 7/2008 | Adamczyk | H04L 67/24 709/204 |
| 2009/0187956 A1 | 7/2009 | Sommer | |
| 2015/0074259 A1* | 3/2015 | Ansari | H04L 67/20 709/224 |
| 2017/0163645 A1* | 6/2017 | Bradley | H04L 63/20 |

FOREIGN PATENT DOCUMENTS

| | | |
|---|---|---|
| CN | 102571967 A | 7/2012 |
| CN | 102638452 A | 8/2012 |
| CN | 105679319 A | 6/2016 |

* cited by examiner

METHOD, APPARATUS AND SERVER FOR PROVIDING VOICE SERVICE

CROSS-REFERENCE TO RELATED APPLICATIONS

This is a continuation of International Application PCT/CN2017/118008, with an international filing date of Dec. 22, 2017, which claims priority to Chinese Patent Application No. 201710525724.1, filed on Jun. 30, 2017, which is hereby incorporated by reference in its entirety.

TECHNICAL FIELD

Embodiments of the present disclosure relate to the field of computer technology, specifically to the field of artificial intelligence, and more specifically to a method, apparatus and server for providing a voice service.

BACKGROUND

With the development of computer technology and the constant accumulation of network data, artificial intelligence technology develops rapidly. In the field of artificial intelligence, intelligent voice services that integrate voice recognition, natural language processing and machine learning technologies are more and more widely used.

At present, different intelligent voice service providers independently develop access protocols for voice services, and provide developers with interfaces for accessing the voice services. The developers may access different intelligent voice services according to different access protocols. However, due to the incompatibility between the access protocols of the intelligent voice services, the developers need to do a lot of repetitive development work when accessing different intelligent voice services, resulting in long development cycles and high costs. The operation and maintenance of subsequent products also need to be separately operated and maintained, resulting in high operation and maintenance costs.

SUMMARY

To solve one or more technical problems mentioned in the Background section, embodiments of the present disclosure provide a method, apparatus, and server for providing a voice service.

In a first aspect, the embodiments of the present disclosure provide a method for providing a voice service, including: receiving a request message for providing a target voice service to a device end that has accessed a third-party voice service, the request message including a request content and status information of the device end; acquiring a response message generated after processing the request content based on the status information of the device end, the response message including an operation instruction; and sending the response message to the device end. The request message and the response message are generated according to a message format configured in a constructed data service framework model of the target voice service, and transmitted based on a transport protocol configured in the constructed data service framework model of the target voice service; and the message format configured in the constructed data service framework model of the target voice service is consistent with a message format of the third-party voice service, and the transport protocol configured in the constructed data service framework model of the target voice service is consistent with a transport protocol of the third-party voice service.

In some embodiments, the method further includes: providing, in response to acquiring a request sent by a user to perform a target voice service registration on the device end, to the user to-be-replaced configuration information of the target voice service, for the user to replace a corresponding configuration item in a configuration file of the device end; and where the to-be-replaced configuration information includes a user identifier, a user password, and a path address for acquiring an access token.

In some embodiments, the method further includes: receiving an access request for accessing the device end to the target voice service, where the access request to the target voice service includes the user identifier, the user password, and an identifier of the device end; and issuing, according to the access request, an access token of the target voice service to the device end, for the device end to acquire the issued access token using the path address for acquiring the access token.

In some embodiments, the issuing, according to the access request, the access token of the target voice service to the device end, includes: identifying, according to the user identifier and the user password, a device identifier authorized by the user; determining whether the identifier of the device end in the access request to the target voice service is consistent with the device identifier authorized by the user; and if the identifier of the device end in the access request to the target voice service is consistent with the device identifier authorized by the user, issuing the access token of the target voice service to the device end.

In some embodiments, the receiving the request message for providing the target voice service to the device end that has accessed the third-party voice service, includes: receiving the request message sent by the device end that has obtained the access token of the target voice service and has accessed the third-party voice service.

In some embodiments, the response message is generated by: parsing the request message to obtain the request content and the status information of the device end; generating the corresponding operation instruction based on the status information of the device end and the request content; and packaging the operation instruction according to the message format and the transport protocol configured in the data service framework model of the target voice service to generate the response message.

In some embodiments, the status information of the device end includes: a capability statement of the device end, context information of the device end, and event information of the device end.

In some embodiments, the generating the corresponding operation instruction based on the status information of the device end and the request content, includes: determining a callable operation interface of the device end based on the capability statement of the device end, the context information of the device end, and the event information of the device end; determining, from the callable operation interface, a target operation interface corresponding to the request content; and determining a voice service content based on the request content, and generating the operation instruction for calling the target operation interface to output the voice service content.

In some embodiments, the acquiring the response message generated after processing the request content based on the status information of the device end, includes: detecting whether the request content includes a voice interaction requirement; and dividing, in response to detecting that the request content includes the voice interaction requirement, voice service data by a preset time length or a preset message length to generate a plurality of response message segments; the sending the response message to the device end, includes: sending the response message segments to the device end sequentially according to generation time of the response message segments.

In some embodiments, the method further includes: constructing the data service framework model of the target voice service, where the data service framework model includes: a transport protocol layer, a message format layer, and a device end capability layer; the constructing the data service framework model of the target voice service includes: constructing the transport protocol layer, including configuring the transport protocol used by the target voice service; constructing the message format layer, including configuring the message format of the request message and the response message of the target voice service; and constructing the device end capability layer, including configuring logic for parsing a capability of the device end from the request message and the response message.

In a second aspect, the embodiments of the present disclosure provide an apparatus for providing a voice service, including: a first receiving unit, configured to receive a request message for providing a target voice service to a device end that has accessed a third-party voice service, the request message including a request content and status information of the device end; an acquisition unit, configured to acquire a response message generated after processing the request content based on the status information of the device end, the response message including an operation instruction; and a sending unit, configured to send the response message to the device end. The request message and the response message are generated according to a message format configured in a constructed data service framework model of the target voice service, and transmitted based on a transport protocol configured in the constructed data service framework model of the target voice service; and the message format configured in the constructed data service framework model of the target voice service is consistent with a message format of the third-party voice service, and the transport protocol configured in the constructed data service framework model of the target voice service is consistent with a transport protocol of the third-party voice service.

In some embodiments, the apparatus further includes: a providing unit, configured to provide, in response to acquiring a request sent by a user to perform a target voice service registration on the device end, to the user to-be-replaced configuration information of the target voice service, for the user to replace a corresponding configuration item in a configuration file of the device end; and where the to-be-replaced configuration information includes a user identifier, a user password, and a path address for acquiring an access token.

In some embodiments, the apparatus further includes: a second receiving unit, configured to receive an access request for accessing the device end to the target voice service, where the access request to the target voice service includes the user identifier, the user password, and an identifier of the device end; and an authorization unit, configured to issue, according to the access request, an access token of the target voice service to the device end, for the device end to acquire the issued access token using the path address for acquiring the access token.

In some embodiments, the authorization unit is further configured to issue an access token of the target voice service to the device end by: identifying, according to the user identifier and the user password, a device identifier authorized by the user; determining whether the identifier of the device end in the access request to the target voice service is consistent with the device identifier authorized by the user; and if the identifier of the device end in the access request to the target voice service is consistent with the device identifier authorized by the user, issuing the access token of the target voice service to the device end.

In some embodiments, the first receiving unit is further configured to: receive the request message sent by the device end that has obtained the access token of the target voice service and has accessed the third-party voice service.

In some embodiments, the response message acquired by the acquisition unit is generated by: parsing the request message to obtain the request content and the status information of the device end; generating the corresponding operation instruction based on the status information of the device end and the request content; and packaging the operation instruction according to the message format and the transport protocol configured in the data service framework model of the target voice service to generate the response message.

In some embodiments, the status information of the device end includes: a capability statement of the device end, context information of the device end, and event information of the device end.

In some embodiments, the operation instruction in the response message acquired by the acquisition unit is generated by: determining a callable operation interface of the device end based on the capability statement of the device end, the context information of the device end, and the event information of the device end; determining, from the callable operation interface, a target operation interface corresponding to the request content; and determining a voice service content based on the request content, and generating the operation instruction for calling the target operation interface to output the voice service content.

In some embodiments, the acquisition unit is further configured to: detect whether the request content includes a voice interaction requirement; and divide, in response to detecting that the request content includes the voice interaction requirement, voice service data by a preset time length or a preset message length to generate a plurality of response message segments; the sending unit is further configured to: send the response message segments to the device end sequentially according to generation time of the response message segments.

In some embodiments, the apparatus further includes: a construction unit, configured to construct the data service framework model of the target voice service, where the data service framework model includes: a transport protocol layer, a message format layer, and a device end capability layer; the construction unit is specifically configured to: construct the transport protocol layer, including configuring the transport protocol used by the target voice service; construct the message format layer, including configuring the message format of the request message and the response message of the target voice service; and construct the device end capability layer, including configuring logic for parsing a capability of the device end from the request message and the response message.

In a third aspect, the embodiments of the present disclosure provide a server, including: one or more processors; and a storage apparatus, for storing one or more programs, the one or more programs, when executed by the one or more processors, cause the one or more processors to implement the method for providing a voice service.

The method, apparatus and server for providing a voice service provided by the embodiments of the present disclosure, receive a request message for providing a target voice service to a device end that has accessed a third-party voice service, the request message including a request content and status information of the device end; then acquire a response message generated after processing the request content based on the status information of the device end, the response message including an operation instruction; and finally send the response message to the device end. The request message and the response message are generated according to a message format configured in a constructed data service framework model of the target voice service and consistent with a message format of the third-party voice service, and transmitted based on a transport protocol configured in the constructed data service framework model of the target voice service and consistent with a transport protocol of the third-party voice service. The method, apparatus and server can quickly access the target voice service by using logic such as service interaction with a developed third-party voice service, and do not need to separately develop the logic such as the service interaction for the target voice service, which is beneficial to reducing the development, operation and maintenance costs of products accessing different voice services.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
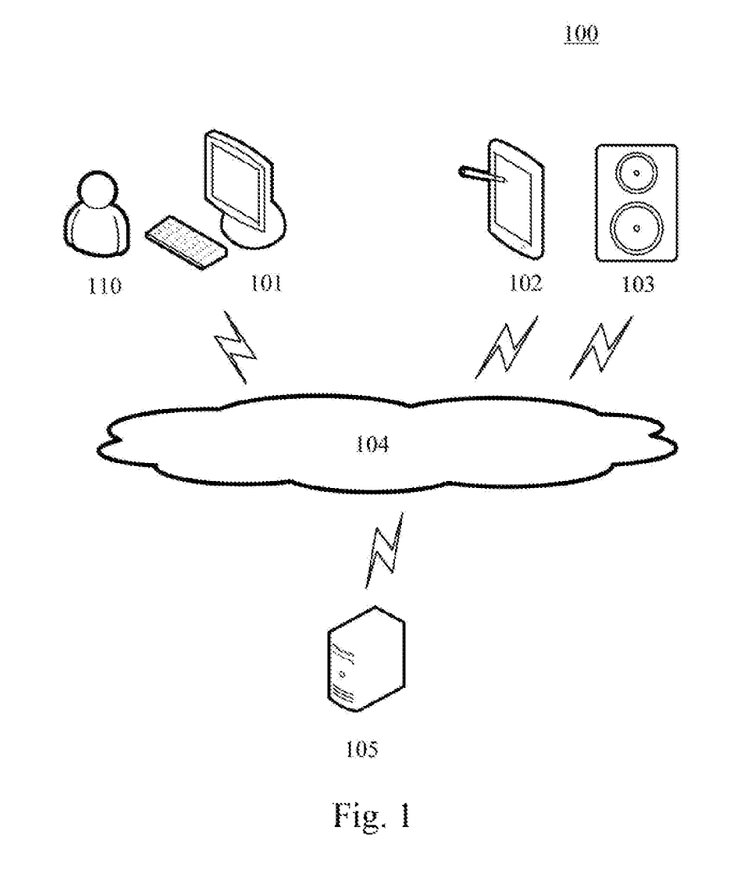
FIG. 1 is a diagram of an exemplary system architecture in which the present disclosure may be implemented.

FIG. 1 illustrates an exemplary system architecture 100 in which a method for providing a voice service or an apparatus for providing a voice service of the present disclosure may be implemented.

As shown in FIG. 1, the system architecture 100 may include a terminal 101, devices 102, 103, a network 104, and a server 105. The network 104 serves as a medium providing a communication link between the terminal 101 and the server 105, and the medium providing a communication link between the devices 102, 103 and the server 105. The network 104 may include a variety of connections, such as wired or wireless communication links, or optic fibers.

A user 110 may interact with the server 105 through the network 104 using the terminal 101 to receive or send messages or the like. An application that interacts with the server 105, such as a web browser application, or a voice service client application, may be installed on the terminal 101. The terminal 101 may be various electronic devices having display screens including, but not limited to, smartphones, tablets, desktop computers, or the like.

The devices 102, 103 may also interact with the server 105 via the network 104 to receive or send messages or the like. The devices 102, 103 may be electronic devices having audio input interfaces and audio output interfaces, such as speakers with microphones.

The server 105 may be a server providing various services, such as a voice server that supports web page content displayed on the terminal 101 and controls audio output operations performed by the devices 102, 103. The voice server may process a request sent by the user 110 through the terminal 101 to perform voice service operations for the devices 102, 103, and send processing results (e.g., audio data and control commands on the audio output interfaces) to the devices 102, 103. The devices 102, 103 may receive the audio data and the control commands sent by the server 105 through the network 104 and perform corresponding operations, thereby enabling the devices 102, 103 to access the voice service provided by the voice server 105.

It should be noted that the method for providing a voice service provided by the embodiments of the present disclosure is generally executed by the server 105. Accordingly, the apparatus for providing a voice service is generally provided in the server 105.

It should be noted that the numbers of the terminal, the device, the network and the server in FIG. 1 are merely illustrative. Any number of the terminal, the device, the network and the server may be provided based on the implementation requirements. For example, the server may be a clustered server, including a plurality of servers deployed with different processes.

Figure 2:
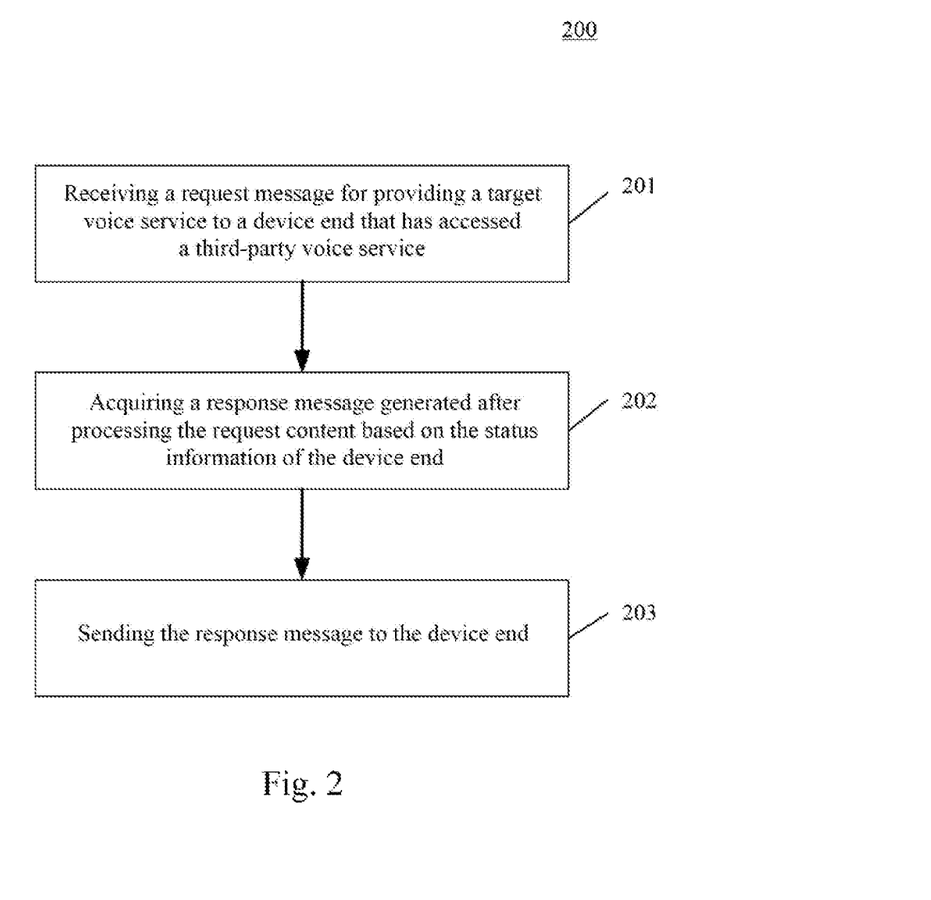
FIG. 2 is a flowchart of an embodiment of a method for providing a voice service according to the present disclosure.

With further reference to FIG. 2, a flow 200 of an embodiment of a method for providing a voice service according to the present disclosure is illustrated. The method for providing a voice service includes the following steps.

Step 201, receiving a request message for providing a target voice service to a device end that has accessed a third-party voice service.

In the present embodiment, an electronic device on which the method for providing a voice service is performed (i.e., the server of a target voice service, such as the server shown in FIG. 1) may receive the request message from an electronic device through which the user makes a voice service request (for example, the terminal 101 shown in FIG. 1), or receive the request message from a device end with which the user performs voice interaction (for example, the devices 102, 103 shown in FIG. 1), through a wired connection or a wireless connection. The request message includes a request content and status information of the device end that has accessed the third-party voice service. The request content may include the content of the voice service requested by the user, for example, may include voice data inputted by the user through an audio input interface. The status information of the device end may be information indicating the current running status of the device end, and may include information of an operation currently being performed on the device end, status information of the current interface of the device end, or the like.

The request message may be a request message for providing a target voice service to a device end that has accessed a third-party voice service. The target voice service and the third-party voice service here may be voice services provided by different servers or server clusters, and both may provide voice services with different characteristics. For example, the third-party voice service and the target voice service may be voice services that support different language types. After accessing the third-party voice service, a device may apply the voice service of a language type (for example, English) supported by the third-party voice service. If the device needs to apply services of other language types (for example, Chinese), it may access target voice services supporting other language types.

In the present embodiment, the request message is generated according to a message format configured in a constructed data service framework model of the target voice service, and transmitted based on a transport protocol configured in the constructed data service framework model of the target voice service, and the message format configured in the constructed data service framework model of the target voice service is consistent with a message format of the third-party voice service, and the transport protocol configured in the constructed data service framework model of the target voice service is consistent with a transport protocol of the third-party voice service. That is to say, the target voice service pre-constructs a data service framework model, and other electronic devices may interact with the server of the target voice service according to the data service framework model. In the above data service framework model, a message format and a transport protocol are configured, and an electronic device interacting with the server of the target voice service may send or receive a message according to the configured message format, and package the message according to the configured transport protocol when transmitting data. A message generated and transmitted according to the message format and transport protocol configured in the above data service framework model may be received and successfully parsed by the server of the target voice service, and further the server of the target voice service may respond based on the content obtained by parsing.

The transport protocol may define a connection between the target voice server and other electronic devices, and may be a universal transport protocol. The message format may define the content represented by a plurality of fields in the message.

For example, if the third-party voice service adopts the Http2.0-based transport protocol and defines that the first field in the message format indicates audio data and the second field indicates a device end status, then when constructing the data service framework of the target voice service, the transport protocol may be configured as Http2.0, and the message format also includes the first field indicating audio data and the second field indicating device end status.

In some alternative implementations, the request message may be sent by the user through an electronic device that establishes a communication connection with the device end. The electronic device may request the device end in advance to acquire the status information of the device end, and the device end may send the status information to the electronic device. In this way, when it is requested to provide the target voice service, the electronic device may send the request content and the status information of the device end together to the server of the target voice service.

In an actual scenario, the user may input the service URL of the target voice service in a browser application of the electronic device (for example, a mobile phone), and select a desired voice service after logging in the user's account, such as voice communication, setting an alarm, or playing music. Or the user may select the requested voice service in a client application of the target voice service (for example, a voice service client installed on the mobile phone). The request content may be generated according to the voice service selected by the user, and combined with the status information of the device end acquired in advance to generate the above request message. The request message is sent to the electronic device on which the method for providing a voice service is performed.

In some other alternative implementations, the request message may be sent by the device end that has accessed the third-party voice service. After the user performs an operation of logging in or entering a voice service on the device end, the device end may generate the request message according to the message format configured in the constructed data service framework model of the target voice service using the status information and the request content, and the request message is transmitted based on the transport protocol configured in the constructed data service framework model of the target voice service.

Step 202, acquiring a response message generated after processing the request content based on the status information of the device end.

After receiving the request message including the request content and the status information of the device end, an intent analysis may be performed on the request content, to determine the intention of the voice service request, and then an operation instruction for the device end to perform is determined. Here, the operation instruction may include voice service data that matches the intent of the voice service request, and a command for controlling the device end to call a specified interface to output the voice service data. A response message including the operation instruction may then be generated.

The electronic device on which the method for providing a voice service is performed (i.e., the server of the target voice service) may acquire the generated response message. Specifically, when the target voice service is deployed on a server cluster including a plurality of servers that maintain communication connections with each other, if the service that generates the response message and the service that sends the response message to the device end are deployed on different servers in the server cluster, the server on which the service that sends the response message to the device end is deployed may receive the response message from the server that generates the response message. If the service that generates the response message and the service that sends the response message to the device end are deployed on the same server in the server cluster, the server may capture the generated response message and cache it.

In the present embodiment, in order to ensure that the server of the target voice service may successfully perform voice service interaction with the device end that has accessed the third-party voice service, the response message is also generated according to the message format configured in the constructed data service framework model of the target voice service, and transmitted based on the transport protocol configured in the constructed data service framework model of the target voice service. Similarly, here, the message format configured in the constructed data service framework model of the target voice service is consistent with the message format of the third-party voice service, and the transport protocol configured in the constructed data service framework model of the target voice service is consistent with the transport protocol of the third-party voice service. In this way, the device end that has accessed the third-party voice service does not need to re-develop an interaction logic for the voice service based on the data service framework of the target voice service, and may interact with the server of the target voice service by using the interaction logic for the developed third-party voice service, thereby significantly reducing development costs.

In some alternative implementations of the present embodiment, the response message may be generated by: parsing the request message to obtain the request content and the status information of the device end; then generating the corresponding operation instruction based on the status information of the device end and the request content; and finally packaging the operation instruction according to the message format and the transport protocol configured in the data service framework model of the target voice service to generate the response message. Here, the electronic device on which the method for providing a voice service is performed (i.e., the server of the target voice service) may parse the request header and the main body in the received request message according to the configured transport protocol. The request header may include an identifier of the device end provided by the user, and the main body may include the request content and other status information of the device end. Then, the corresponding request content and the status information of the device end may be extracted according to the configured message format. After that, an operation executable by the device end may be determined based on the status information of the device end, voice service data corresponding to the request content may be found, and an operation instruction including the operation for the voice service data is generated. Finally, the response message may be generated by packaging the operation instruction using the request header, a request approach, a uniform resource identifier, or the like in the configured transport protocol.

Further, the status information of the device end in the above request message may include: a capability statement of the device end, context information of the device end, and event information of the device end. The capability statement of the device end may be a statement of the capability of the device end reported by the device end, that is, a statement of the interface of the device end that may be called, including voice input, voice output, speaker control, audio player, alarm clock, settings, or the like. The context information of the device end may be the current status of the device end reported by the device end or the operation currently being executed by the device end, for example, whether the device end is currently playing music, whether the device end is receiving a voice input, or whether the device end has set an alarm. The event information of the device end may be information about an event occurring on the device end, such as whether the alarm clock on the device end is ringing, the device end starts playing music, or the device end ends playing music. The status information of the device end may be reported by the device end and attached to the main body of the request message.

Further, in the process of generating the response message, the step of generating the corresponding operation instruction based on the status information of the device end and the request content may include: determining a callable operation interface of the device end based on the capability statement of the device end, the context information of the device end, and the event information of the device end; determining, from the callable operation interface, a target operation interface corresponding to the request content; and determining a voice service content based on the request content, and generating the operation instruction for calling the target operation interface to output the voice service content.

Specifically, the callable operation interface that may be used for responding to the request message may be determined based on the capability statement of the device end (i.e., the operation interface of the device end), the operation currently performed by the device end, and the event information occurred on the device end. The target operation interface is determined based on the request content. For example, the request content is to query the weather condition, then it is determined that the target operation interface includes a voice output interface. Then, the content of the voice service may be determined based on the request content, that is, find and generate voice service data. For example, when the request content is to query the weather condition, a text of the current weather condition may be found through the Internet, and converted into audio data as the voice service data. Finally, the voice service content and the target operation interface may be used to generate the operation instruction, for example, the above audio data and the called voice output interface are combined to generate the operation instruction. In this way, the interface that is currently available to be called on the device end is accurately located based on the status information of the device end. The service result of the voice service is prevented from conflicting with the operation currently being performed by the device end, thereby avoiding a delay in response of the voice service.

Step 203, sending the response message to the device end.

After acquiring the response message generated based on the request content and the status information of the device end, the electronic device on which the method for providing a voice service is performed may send the response message to the device end through the network. The response message includes an operation instruction.

The device end may receive and parse the response message to obtain the above operation instruction. Then, the device end may call a corresponding interface to output the voice service data according to the operation instruction.

Here, the device end has developed logic for interacting with the third-party voice service when accessing the third-party voice service, and the device end may use the developed logic to receive the response message transmitted based on the transport protocol of the third-party voice service. Moreover, the message format of the response message is consistent with the message format of the third-party voice service, and the device end may successfully parse the content represented by the fields in the response message using the developed logic, for example, extracting the called interface and the data outputted by the interface, and then performing a corresponding operation.

Figure 3A:
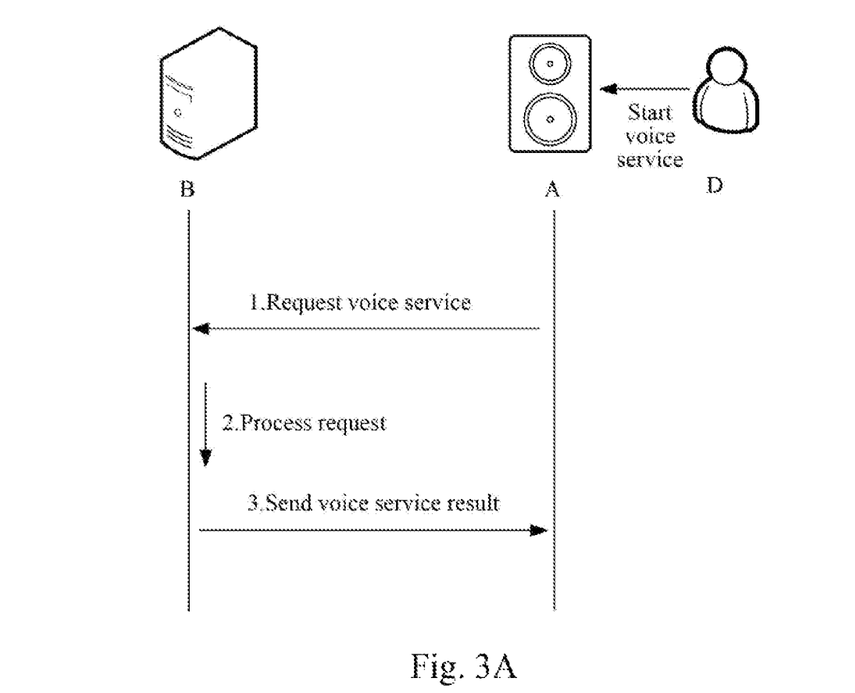
FIG. 3A is a schematic diagram of an application scenario of the method for providing a voice service according to the present disclosure.
Figure 3B:
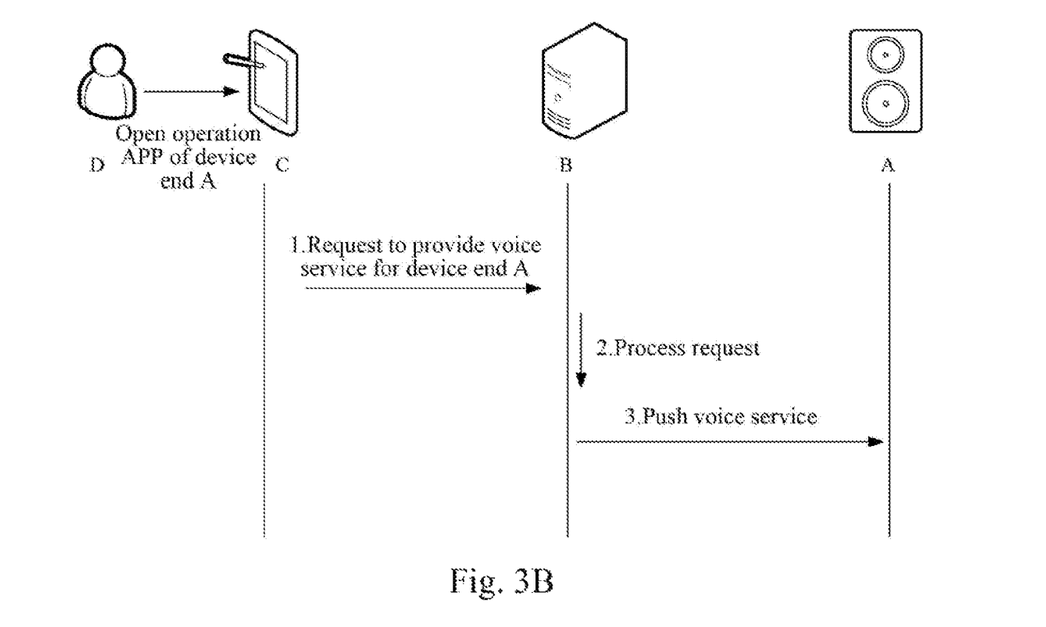
FIG. 3B is a schematic diagram of another application scenario of the method for providing a voice service according to the present disclosure.

With further reference to FIGS. 3A and 3B, schematic diagrams of two scenarios of the method for providing a voice service according to the present disclosure are illustrated.

As shown in FIG. 3A, in a scenario, a user D starts a voice service by operating on a device end A that has accessed a third-party voice service. In response to detecting the operation of the user, the device end A may send a request message to a server B of a target voice service in step 1, requesting to provide the target voice service for the device end A. The server B processes the request in step 2 to obtain a voice service result, and in step 3, sends the voice service result to the device end A in the form of a response message. In this process, the request message sent by the device end A to the server B in step 1 and the response message sent by the server B to the device end in step 3 are all generated according to the message format configured in the constructed data service framework model of the target voice service, and consistent with the message format of the third-party voice service, and are transmitted based on the transport protocol configured in the constructed data service framework model of the target voice service, and consistent with the transport protocol of the third-party voice service.

As shown in FIG. 3B, in another scenario, the user D may open an operation application (APP) of the device end A on an electronic device C that has been connected to the device end A, and the user D may request to push a target voice service to the device end A in the operation application of the device end A. The electronic device C may generate a request message requesting to provide a voice service for the device end A in response to a request inputted by the user, and send the request message to the server B of the target voice service in step 1, and the server B processes the request message in step 2 to obtain a voice service result, and in step 3, sends the voice service result to the device end A in the form of a response message. In this process, the request message sent by the electronic device C to the server B in step 1 and the response message sent by the server B to the device end in step 3 are all generated according to the message format configured in the constructed data service framework model of the target voice service, and consistent with the message format of the third-party voice service, and are transmitted based on the transport protocol configured in the constructed data service framework model of the target voice service, and consistent with the transport protocol of the third-party voice service.

The method for providing a voice service provided by the embodiments of the present disclosure, receives a request message for providing a target voice service to a device end that has accessed a third-party voice service, the request message including a request content and status information of the device end; then acquires a response message generated after processing the request content based on the status information of the device end, the response message including an operation instruction; and finally sends the response message to the device end. The request message and the response message are generated according to a message format configured in a constructed data service framework model of the target voice service and consistent with a message format of the third-party voice service, and transmitted based on a transport protocol configured in the constructed data service framework model of the target voice service and consistent with a transport protocol of the third-party voice service. The method can quickly access the target voice service by using logic such as service interaction with a developed third-party voice service, and does not need to separately develop the logic such as the service interaction for the target voice service, which is beneficial to reducing the development, operation and maintenance costs of products accessing different voice services.

In a specific application scenario, before the server of the target voice service provides the voice service, the user needs to be prompted to change the configuration information of the device end associated with the interaction process with the third-party voice service to establish a connection with the target voice service.

Specifically, in some embodiments, the method for providing a voice service may further include: providing, in response to acquiring a request sent by a user to perform a target voice service registration on the device end, to the user to-be-replaced configuration information of the target voice service, for the user to replace a corresponding configuration item in a configuration file of the device end. Here, the to-be-replaced configuration information includes a user identifier, a user password, and a path address for acquiring an access token. The user may log in to the service platform of the target voice service and register, and the server of the target voice service may provide the user identifier, the user password, and the path address for acquiring the access token after the user is registered. The user may use the username and password to replace the username and password in the configuration file (for example, the configuration file config.json of the javaClient toolkit) of the device end, and replace the configuration file of the device end for defining the login mode. At the same time, the user may modify the path address for acquiring the access token in the configuration file of the device end for defining the access token acquisition mode.

Further, before requesting the target voice service, the device end needs to acquire an access token of the target voice service, and connects the interface of the target voice service using the access token. Specifically, in some embodiments, the method for providing a voice service may further include: receiving an access request for accessing the device end to the target voice service, and issuing, according to the access request, an access token of the target voice service to the device end, for the device end to acquire the issued access token using the path address for acquiring the access token. The access request includes the user identifier, the user password, and an identifier of the device end. That is, the user may send a request for accessing the device end to the target voice service in the platform of the target voice service, and the request includes the user identifier and the user password provided by the server of the target voice service when the user is registered. The user may also add an identifier of the device end in the access request to authorize the device end to request the target voice service on behalf of the user. The server of the target voice service may authenticate according to the user identifier and the user password, and issue the token to the device end.

Further, the step of issuing, according to the access request, an access token of the target voice service to the device end, may include: identifying, according to the user identifier and the user password, a device identifier authorized by the user; determining whether the identifier of the device end in the access request to the target voice service is consistent with the device identifier authorized by the user; and if the identifier of the device end in the access request to the target voice service is consistent with the device identifier authorized by the user, issuing the access token of the target voice service to the device end. Here, after registering or logging in, the user may provide an authorized device identifier to the server of the target voice service. After receiving the access request submitted by the user, the identifier of the device end in the access request may be compared with the authorized device identifier. If they are consistent, the access token may be issued to the device end. The device end may acquire the issued access token according to the path for acquiring the access token in the modified configuration file, and use the access token to connect to the interface of the target voice service.

In this case, further, the step of receiving a request message for providing a target voice service to a device end that has accessed a third-party voice service (i.e., step 201) may include: receiving the request message sent by the device end that has obtained the access token of the target voice service and has accessed the third-party voice service. That is, the server of the target voice service only receives the request message for providing the voice service to the device end that has acquired the access token. In this way, the problem of unavailable service due to too high request frequency to the server of the target voice service may be avoided, and the security of the target voice service may also be improved.

Figure 4:
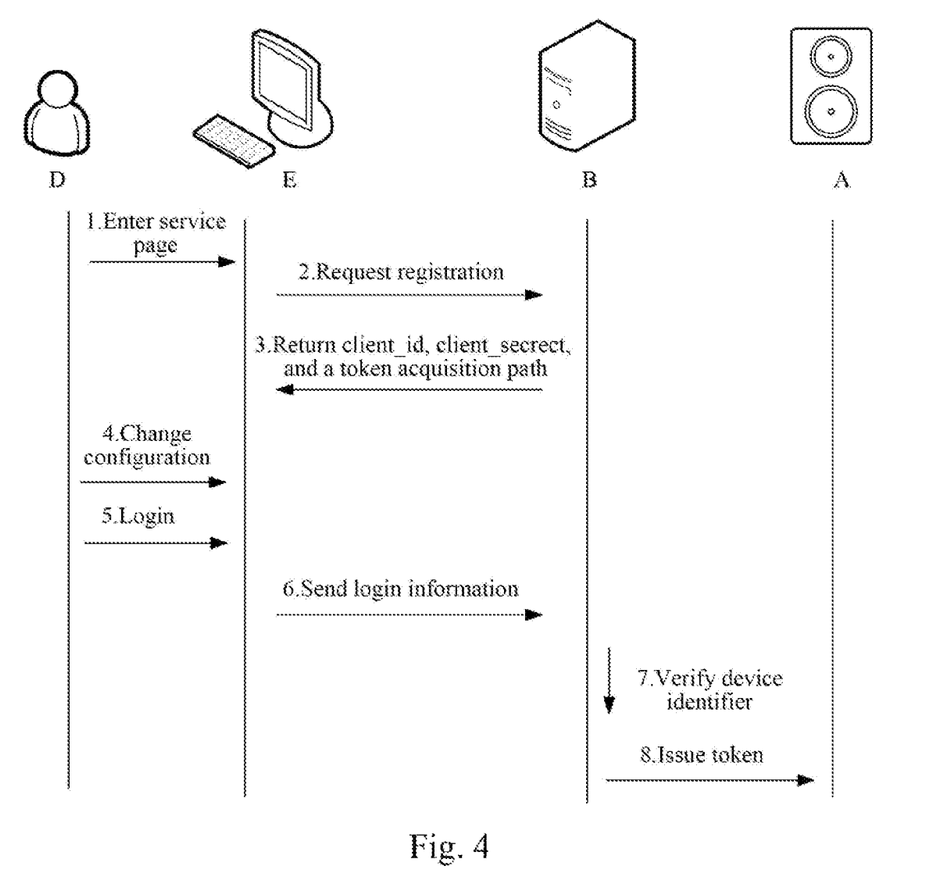
FIG. 4 is a schematic diagram of an application scenario of a method for accessing a voice service in the method for providing a voice service according to the present disclosure.

With further reference to FIG. 4, a schematic diagram of an application scenario of a method for accessing a voice service in the method for providing a voice service according to the present disclosure is illustrated.

As shown in FIG. 4, in step 1, the user D uses a terminal device E to enter the service page of the target voice service, and the specific approach may be to open the URL of the target voice service platform. In step 2, the terminal device E requests for registration to the server B of the target voice service according to the registration operation of the user. After the registration, in step 3, the server B returns the username (client_id), the password (client_secrect), and a token acquisition path to the terminal device E. The terminal device E displays the username, the password, and the token acquisition path to the user D. In step 4, the user uses the username, the password, and the token acquisition path provided by the server B to change the corresponding configuration.

Then, the device end A needs to access the target voice service provided by the server B. In step 5, the user uses the terminal device E to perform the login operation, that is to input the user identifier, the user password, and the identifier of the device end A. In step 6, the terminal device E sends the login information (the user identifier, the user password, and the identifier of the device end A) to the server B. In step 7, the server B verifies whether the identifier of the device end A is consistent with the device identifier authorized by the user based on the user identifier and the user password. After the verification is passed, the token is issued to the device end A in step 8. Thus, the device end A accesses the voice service provided by the server B.

In the above embodiment, the user is provided with to-be-replaced configuration information when the user is registered, to prompt the user to replace a corresponding configuration item of the device end. The user may enable the device end to acquire the access token through a simple configuration item replacement operation and login authorization operation, thereby providing a reliable voice service while reducing the technical threshold for accessing the target voice service, which effectively reduces the development workload for accessing the target voice service, and facilitates the provision of diverse voice services with high efficiency and low costs.

In some practical application scenarios of the above embodiment, the request content may include audio stream data inputted by the user. At this time, the electronic device on which the method for providing a voice service is performed may perform voice activity detection (VAD), to detect a gap in the audio stream data inputted by the user, that is to detect a pause in the user's speech, and divide the audio stream data inputted by the user into a plurality of segments according to the detected pause. During the interaction between the device end and the server of the voice service, the user inputs a plurality of pieces of audio stream data, and the server of the voice service may correspondingly return a plurality of response message segments, and each response message segment may correspond to an audio stream data segment.

In some alternative implementations of the present embodiment, in the step of the acquiring a response message generated after processing the request content based on the status information of the device end, it may first be detected whether the request content includes a voice interaction requirement. For example, when the request content is to set an alarm, the request content does not contain a voice interaction requirement. When the request content is a question-based conversation, the request content contains a voice interaction requirement. When it is detected that the request content includes a voice interaction requirement, voice service data may be divided by a preset time length or a preset message length to generate a plurality of response message segments. The preset time length and the preset message length may be pre-configured.

For example, during the interaction between the device end and the server of the voice service, the server of the voice service may segment and return the result of the voice service. In this process, the server of the voice service may send response message segments to the device end in the form of data stream, that is, the response message segments may be sequentially sent to the device end according to the generation time of the response message segments. In this way, the problem of the poor real-time performance of the voice service due to too long processing time of the request message may be avoided.

Figure 5:
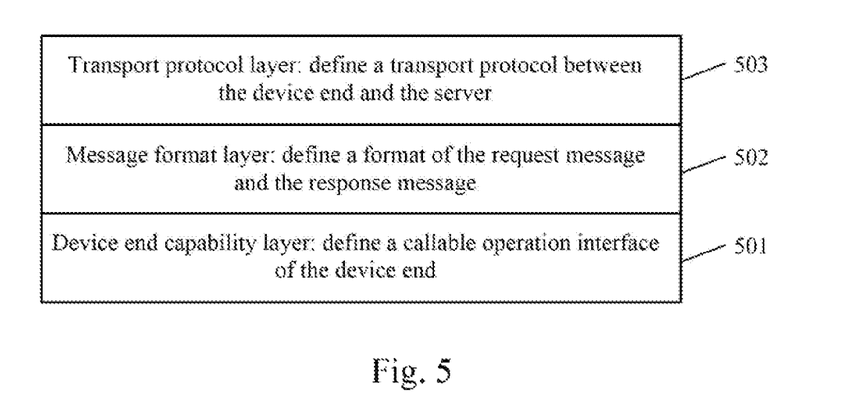
FIG. 5 is a schematic diagram of a data service framework model of a target voice service.

In some embodiments, the method for providing a voice service may further include steps of constructing the data service framework model of the target voice service. With reference to FIG. 5, a schematic structure of a data service framework model of a target voice service of the present embodiment is illustrated.

As shown in FIG. 5, the data service framework model of the target voice service includes a transport protocol layer 501, a message format layer 502, and a device end capability layer 503. The transport protocol layer 501 is located at the lowest layer and is used to define a transport protocol between the device end and the server, and may be defined as a transport protocol consistent with the third-party voice service. The message format layer 502 may be used to define the format of the request message and the response message, such as defining the content represented by the fields in the main body of the request message. The device end capability layer 503 is located at the top layer and used to define a callable operation interface of the device end, that is to define various capabilities of the device end, such as a voice output capability, or a volume control capability.

In the present embodiment, the step of constructing the data service framework model of the target voice service may include: constructing the transport protocol layer, including configuring the transport protocol used by the target voice service; constructing the message format layer, including configuring the message format of the request message and the response message of the target voice service; and constructing the device end capability layer, including configuring logic for parsing a capability of the device end from the request message and the response message. After the data service framework is constructed, the target voice service may perform message transmission according to the transport protocol and the message format configured in the framework, and may parse the request message and the response message based on the configured logic for parsing the capability of the device end from the request message and the response message. Using the data service framework, the server of the target voice service may acquire the request content of the device end and callable interface information of the device end, and further respond based on the request content and the callable interface information of the device end, and generate an operation instruction in response.

The above data service framework model of the target voice service may be compatible with the third-party voice service, so that the device end may access different voice services without a lot of repetitive development work.

Figure 6:
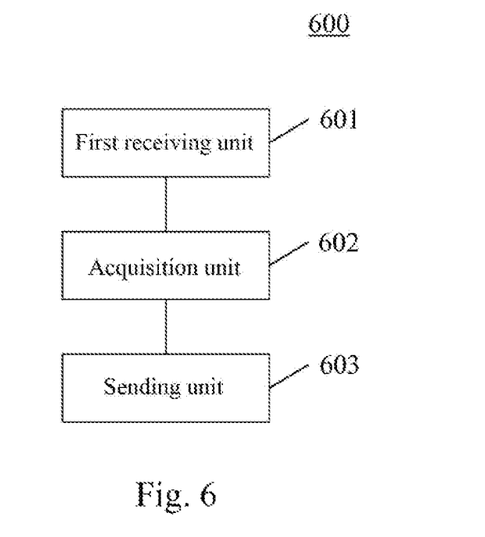
FIG. 6 is a schematic structural diagram of an embodiment of an apparatus for providing a voice service according to the present disclosure.

With further reference to FIG. 6, as an implementation of the method shown in the above FIG. 2, the present disclosure provides an embodiment of an apparatus for providing a voice service, and the apparatus embodiment corresponds to the method embodiment as shown in FIG. 2, and the apparatus may be specifically applied to a server of a target voice service.

As shown in FIG. 6, the apparatus 600 for providing a voice service of the present embodiment includes: a first receiving unit 601, an acquisition unit 602 and a sending unit 603. The first receiving unit 601 is configured to receive a request message for providing a target voice service to a device end that has accessed a third-party voice service, the request message including a request content and status information of the device end. The acquisition unit 602 is configured to acquire a response message generated after processing the request content based on the status information of the device end, the response message including an operation instruction. The sending unit 603 is configured to send the response message to the device end.

In the present embodiment, the request message and the response message are generated according to a message format configured in a constructed data service framework model of the target voice service, and transmitted based on a transport protocol configured in the constructed data service framework model of the target voice service. In addition, the message format configured in the constructed data service framework model of the target voice service is consistent with a message format of the third-party voice service, and the transport protocol configured in the constructed data service framework model of the target voice service is consistent with a transport protocol of the third-party voice service.

In the present embodiment, the first receiving unit 601 may receive the above request message through the network from an electronic device on which a user performs a voice service request (for example, the terminal 101 shown in FIG. 1), or from a device end that the user uses to perform voice interaction (for example, the devices 102, 103 shown in FIG. 1). The request message is transmitted according to the transport protocol of the third-party voice service, and organized according to the message format defined by the third-party voice service. In this way, when the device end sends the request message, the target voice service may receive and parse the request message without changing the logic for interacting with the third-party voice service.

The acquisition unit 602 may acquire the response message generated in response to the request message. The response message includes an operation instruction on the device end, and the operation instruction may include outputted voice service data and a called operation interface of the device end. The response message here is also transmitted according to the transport protocol of the third-party voice service, and organized according to the message format defined by the third-party voice service. In this way, when the response message is sent to the device end, the device end may receive and parse the response message without changing the logic for interacting with the third-party voice service.

The sending unit 603 may send the response message to the device end, for the device end to perform a corresponding operation based on the response message.

In some embodiments, the apparatus 600 may further include: the apparatus 600 may further include: a providing unit, configured to provide, in response to acquiring a request sent by a user to perform a target voice service registration on the device end, to the user to-be-replaced configuration information of the target voice service, for the user to replace a corresponding configuration item in a configuration file of the device end; and the to-be-replaced configuration information includes a user identifier, a user password, and a path address for acquiring an access token.

In a further embodiment, the apparatus may further include: a second receiving unit, configured to receive an access request for accessing the device end to the target voice service, where the access request to the target voice service includes the user identifier, the user password, and an identifier of the device end; and an authorization unit, configured to issue, according to the access request, an access token of the target voice service to the device end, for the device end to acquire the issued access token using the path address for acquiring the access token.

In a further embodiment, the authorization unit may be further configured to issue an access token of the target voice service to the device end by: identifying, according to the user identifier and the user password, a device identifier authorized by the user; determining whether the identifier of the device end in the access request to the target voice service is consistent with the device identifier authorized by the user; and if the identifier of the device end in the access request to the target voice service is consistent with the device identifier authorized by the user, issuing the access token of the target voice service to the device end.

In a further embodiment, the first receiving unit may be further configured to: receive the request message sent by the device end that has obtained the access token of the target voice service and has accessed the third-party voice service.

In some embodiments, the response message acquired by the acquisition unit may be generated by: parsing the request message to obtain the request content and the status information of the device end; generating the corresponding operation instruction based on the status information of the device end and the request content; and packaging the operation instruction according to the message format and the transport protocol configured in the data service framework model of the target voice service to generate the response message. Alternatively, the acquisition unit may include a generation module, and the generation module is configured to generate the response message according to the above method.

Further, the status information of the device end may include: a capability statement of the device end, context information of the device end, and event information of the device end.

Further, the operation instruction in the response message acquired by the acquisition unit may be generated as follows, that is the generation module may generate the response message by: determining a callable operation interface of the device end based on the capability statement of the device end, the context information of the device end, and the event information of the device end; determining, from the callable operation interface, a target operation interface corresponding to the request content; and determining a voice service content based on the request content, and generating the operation instruction for calling the target operation interface to output the voice service content.

In some embodiments, the acquisition unit may be further configured to: detect whether the request content includes a voice interaction requirement; and divide, in response to detecting that the request content includes the voice interaction requirement, voice service data by a preset time length or a preset message length to generate a plurality of response message segments; the sending unit is further configured to: send the response message segments to the device end sequentially according to generation time of the response message segments.

In some embodiments, the apparatus 600 may further include: a construction unit, configured to construct the data service framework model of the target voice service, where the data service framework model includes: a transport protocol layer, a message format layer, and a device end capability layer; the construction unit is specifically configured to: construct the transport protocol layer, including configuring the transport protocol used by the target voice service; construct the message format layer, including configuring the message format of the request message and the response message of the target voice service; and construct the device end capability layer, including configuring logic for parsing a capability of the device end from the request message and the response message.

It should be understood that the units recorded in the apparatus 600 correspond to the various steps in the method described with reference to FIG. 2. Thus, the operations and features described above for the method are equally applicable to the apparatus 600 and the units contained therein, and detailed description thereof will be omitted.

In the apparatus 600 for providing a voice service provided by the embodiments of the present disclosure, the first receiving unit 601 receives a request message for providing a target voice service to a device end that has accessed a third-party voice service, the acquisition unit acquires a response message generated after processing the request content based on the status information of the device end, and the sending unit sends the response message to the device end. The request message and the response message are generated according to a message format configured in a constructed data service framework model of the target voice service and consistent with a message format of the third-party voice service, and transmitted based on a transport protocol configured in the constructed data service framework model of the target voice service and consistent with a transport protocol of the third-party voice service. The logical that has been developed on the device end and interacts with the third-party voice service may be reused to quickly access the target voice service, which greatly reduces the development workload when accessing the device end to the target voice service, and is beneficial to reducing the development, operation and maintenance costs of products accessing different voice services.

Figure 7:
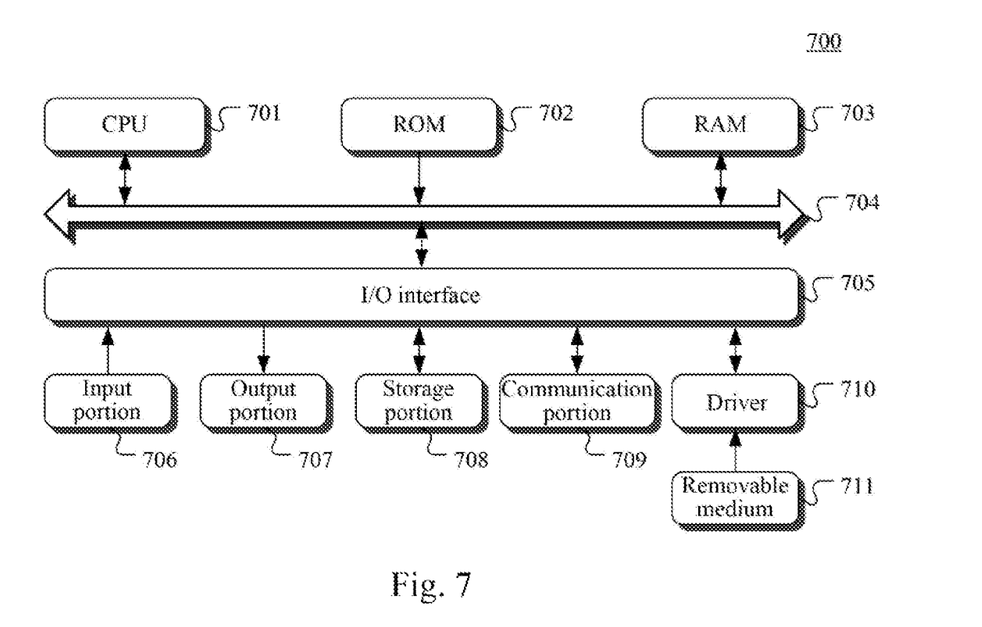
FIG. 7 is a schematic structural diagram of a computer system adapted to implement a server of embodiments of the present disclosure.

With further reference to FIG. 7, a schematic structural diagram of a computer system 700 adapted to implement a server of the embodiments of the present disclosure is shown. The server shown in FIG. 7 is merely an example, and should not impose any limitation on the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first receiving unit, an acquisition unit and a sending unit. Here, the names of these units do not in some cases constitute limitations to such units themselves. For example, the first receiving unit may also be described as "a unit for receiving a request message for providing a target voice service to a device end that has accessed a third-party voice service".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive a request message for providing a target voice service to a device end that has accessed a third-party voice service, the request message including a request content and status information of the device end; acquire a response message generated after processing the request content based on the status information of the device end, the response message including an operation instruction; and send the response message to the device end; where, the request message and the response message are generated according to a message format configured in a constructed data service framework model of the target voice service, and transmitted based on a transport protocol configured in the constructed data service framework model of the target voice service; and the message format configured in the constructed data service framework model of the target voice service is consistent with a message format of the third-party voice service, and the transport protocol configured in the constructed data service framework model of the target voice service is consistent with a transport protocol of the third-party voice service.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for providing a voice service, the method comprising:
   receiving a request message for providing a target voice service to a device end that has accessed a third-party voice service, the request message comprising a request content and status information of the device end;
   acquiring a response message generated after processing the request content based on the status information of the device end, the response message comprising an operation instruction; and
   sending the response message to the device end;
   the request message and the response message being generated according to a message format configured in a constructed data service framework model of the target voice service, and transmitted based on a transport protocol configured in the constructed data service framework model of the target voice service; and
   the message format configured in the constructed data service framework model of the target voice service being consistent with a message format of the third-party voice service, and the transport protocol configured in the constructed data service framework model of the target voice service being consistent with a transport protocol of the third-party voice service.

2. The method according to claim 1, the method further comprising:
   providing, in response to acquiring a request sent by a user to perform a target voice service registration on the device end, to the user to-be-replaced configuration information of the target voice service, for the user to replace a corresponding configuration item in a configuration file of the device end; and
   wherein the to-be-replaced configuration information comprises a user identifier, a user password, and a path address for acquiring an access token.

3. The method according to claim 2, the method further comprising:
   receiving an access request for accessing the device end to the target voice service, wherein the access request to the target voice service comprises the user identifier, the user password, and an identifier of the device end; and issuing, according to the access request, an access token of the target voice service to the device end, for the device end to acquire the issued access token using the path address for acquiring the access token.

4. The method according to claim 3, wherein the issuing, according to the access request, the access token of the target voice service to the device end, comprises:
identifying, according to the user identifier and the user password, a device identifier authorized by the user;
determining whether the identifier of the device end in the access request to the target voice service is consistent with the device identifier authorized by the user; and
if the identifier of the device end in the access request to the target voice service is consistent with the device identifier authorized by the user, issuing the access token of the target voice service to the device end.

5. The method according to claim 4, wherein the receiving the request message for providing the target voice service to the device end that has accessed the third-party voice service, comprises:
receiving the request message sent by the device end that has obtained the access token of the target voice service and has accessed the third-party voice service.

6. The method according to claim 1, wherein the response message is generated by:
parsing the request message to obtain the request content and the status information of the device end;
generating the corresponding operation instruction based on the status information of the device end and the request content; and
packaging the operation instruction according to the message format and the transport protocol configured in the data service framework model of the target voice service to generate the response message.

7. The method according to claim 6, wherein the status information of the device end comprises: a capability statement of the device end, context information of the device end, and event information of the device end.

8. The method according to claim 7, wherein the generating the corresponding operation instruction based on the status information of the device end and the request content, comprises:
determining a callable operation interface of the device end based on the capability statement of the device end, the context information of the device end, and the event information of the device end;
determining, from the callable operation interface, a target operation interface corresponding to the request content; and
determining a voice service content based on the request content, and generating the operation instruction for calling the target operation interface to output the voice service content.

9. The method according to claim 1, wherein the acquiring the response message generated after processing the request content based on the status information of the device end, comprises:
detecting whether the request content comprises a voice interaction requirement; and
dividing, in response to detecting that the request content comprises the voice interaction requirement, voice service data by a preset time length or a preset message length to generate a plurality of response message segments;

the sending the response message to the device end, comprises:
sending the response message segments to the device end sequentially according to generation time of the response message segments.

10. The method according to claim 1, the method further comprising:
constructing the data service framework model of the target voice service, wherein the data service framework model comprises: a transport protocol layer, a message format layer, and a device end capability layer;
the constructing the data service framework model of the target voice service comprises:
constructing the transport protocol layer, comprising configuring the transport protocol used by the target voice service;
constructing the message format layer, comprising configuring the message format of the request message and the response message of the target voice service; and
constructing the device end capability layer, comprising configuring logic for parsing a capability of the device end from the request message and the response message.

11. An apparatus for providing a voice service, the apparatus comprising:
at least one processor; and
a memory storing instructions, the instructions when executed by the at least one processor, cause the at least one processor to perform operations, the operations comprising:
receiving a request message for providing a target voice service to a device end that has accessed a third-party voice service, the request message comprising a request content and status information of the device end;
acquiring a response message generated after processing the request content based on the status information of the device end, the response message comprising an operation instruction; and
sending the response message to the device end;
the request message and the response message being generated according to a message format configured in a constructed data service framework model of the target voice service, and transmitted based on a transport protocol configured in the constructed data service framework model of the target voice service; and
the message format configured in the constructed data service framework model of the target voice service being consistent with a message format of the third-party voice service, and the transport protocol configured in the constructed data service framework model of the target voice service being consistent with a transport protocol of the third-party voice service.

12. The apparatus according to claim 11, the operations further comprising:
providing, in response to acquiring a request sent by a user to perform a target voice service registration on the device end, to the user to-be-replaced configuration information of the target voice service, for the user to replace a corresponding configuration item in a configuration file of the device end; and
wherein the to-be-replaced configuration information comprises a user identifier, a user password, and a path address for acquiring an access token.

13. The apparatus according to claim 12, the operations further comprising:

receiving an access request for accessing the device end to the target voice service, wherein the access request to the target voice service comprises the user identifier, the user password, and an identifier of the device end; and issuing, according to the access request, an access token of the target voice service to the device end, for the device end to acquire the issued access token using the path address for acquiring the access token.

14. The apparatus according to claim 13, wherein the issuing, according to the access request, the access token of the target voice service to the device end, comprises:

identifying, according to the user identifier and the user password, a device identifier authorized by the user;

determining whether the identifier of the device end in the access request to the target voice service is consistent with the device identifier authorized by the user; and if the identifier of the device end in the access request to the target voice service is consistent with the device identifier authorized by the user, issuing the access token of the target voice service to the device end.

15. The apparatus according to claim 14, wherein the receiving the request message for providing the target voice service to the device end that has accessed the third-party voice service, comprises:

receiving the request message sent by the device end that has obtained the access token of the target voice service and has accessed the third-party voice service.

16. The apparatus according to claim 11, wherein the response message is generated by:

parsing the request message to obtain the request content and the status information of the device end;

generating the corresponding operation instruction based on the status information of the device end and the request content; and packaging the operation instruction according to the message format and the transport protocol configured in the data service framework model of the target voice service to generate the response message.

17. The apparatus according to claim 16, wherein the status information of the device end comprises: a capability statement of the device end, context information of the device end, and event information of the device end.

18. The apparatus according to claim 17, wherein the generating the corresponding operation instruction based on the status information of the device end and the request content, comprises:

determining a callable operation interface of the device end based on the capability statement of the device end, the context information of the device end, and the event information of the device end;

determining, from the callable operation interface, a target operation interface corresponding to the request content; and determining a voice service content based on the request content, and generating the operation instruction for calling the target operation interface to output the voice service content.

19. The apparatus according to claim 11, wherein the acquiring the response message generated after processing the request content based on the status information of the device end, comprises:

detecting whether the request content comprises a voice interaction requirement; and dividing, in response to detecting that the request content comprises the voice interaction requirement, voice service data by a preset time length or a preset message length to generate a plurality of response message segments;

the sending the response message to the device end, comprises:

sending the response message segments to the device end sequentially according to generation time of the response message segments.

20. The apparatus according to claim 11, the operations further comprising:

constructing the data service framework model of the target voice service, wherein the data service framework model comprises: a transport protocol layer, a message format layer, and a device end capability layer;

the constructing the data service framework model of the target voice service comprises:

constructing the transport protocol layer, comprising configuring the transport protocol used by the target voice service;

constructing the message format layer, comprising configuring the message format of the request message and the response message of the target voice service; and constructing the device end capability layer, comprising configuring logic for parsing a capability of the device end from the request message and the response message.

21. A non-transitory computer readable medium, storing a computer program thereon, the computer program, when executed by a processor, causes the processor to perform operations, the operations comprising:

receiving a request message for providing a target voice service to a device end that has accessed a third-party voice service, the request message comprising a request content and status information of the device end;

acquiring a response message generated after processing the request content based on the status information of the device end, the response message comprising an operation instruction; and sending the response message to the device end;

the request message and the response message being generated according to a message format configured in a constructed data service framework model of the target voice service, and transmitted based on a transport protocol configured in the constructed data service framework model of the target voice service; and the message format configured in the constructed data service framework model of the target voice service being consistent with a message format of the third-party voice service, and the transport protocol configured in the constructed data service framework model of the target voice service being consistent with a transport protocol of the third-party voice service.

* * * * *